United States Patent
Arslan et al.

(10) Patent No.: US 11,212,811 B2
(45) Date of Patent: Dec. 28, 2021

(54) METHOD FOR DETERMINING USERS AT THE NUMEROLOGY EDGES IN FIFTH GENERATION CELLULAR COMMUNICATIONS SYSTEMS

(71) Applicant: Istanbul Medipol Universitesi, Istanbul (TR)

(72) Inventors: Hüseyin Arslan, Istanbul (TR); Ahmet Yazar, Istanbul (TR)

( * ) Notice: Subject to any disclaimer, the term of this patent is extended or adjusted under 35 U.S.C. 154(b) by 61 days.

(21) Appl. No.: 16/757,001

(22) PCT Filed: May 31, 2019

(86) PCT No.: PCT/TR2019/050407
§ 371 (c)(1),
(2) Date: Apr. 17, 2020

(87) PCT Pub. No.: WO2019/236045
PCT Pub. Date: Dec. 12, 2019

(65) Prior Publication Data
US 2020/0337061 A1    Oct. 22, 2020

(30) Foreign Application Priority Data
Jun. 8, 2018   (TR) .................................. 2018/08131

(51) Int. Cl.
*H04W 72/08* (2009.01)
*H04B 17/318* (2015.01)
*H04W 72/04* (2009.01)
*H04W 84/04* (2009.01)
*H04W 88/08* (2009.01)

(52) U.S. Cl.
CPC ........ *H04W 72/082* (2013.01); *H04B 17/318* (2015.01); *H04W 72/0453* (2013.01); *H04W 84/042* (2013.01); *H04W 88/08* (2013.01)

(58) Field of Classification Search
CPC ........... H04W 72/082; H04W 72/0453; H04W 84/042; H04W 88/08; H04W 52/346; H04W 52/225; H04W 72/08; H04B 17/318; H04L 5/0037; H04L 5/0062; H04L 5/0007
See application file for complete search history.

(56) References Cited

U.S. PATENT DOCUMENTS

| | | |
|---|---|---|
| 2018/0034683 A1 | 2/2018 | Li et al. |
| 2018/0091373 A1* | 3/2018 | Manolakos ......... H04W 72/005 |
| 2019/0150132 A1* | 5/2019 | Bala .................... H04W 72/042 |
| | | 370/329 |

(Continued)

FOREIGN PATENT DOCUMENTS

WO   2017209585 A1   12/2017

OTHER PUBLICATIONS

International Search Report for corresponding PCT/TR2019/050407.
Written Opinion of the ISA for corresponding PCT/TR2019/050407.

*Primary Examiner* — Hassan Kizou
*Assistant Examiner* — Abdullahi Ahmed
(74) *Attorney, Agent, or Firm* — Egbert, McDaniel & Swartz, PLLC

(57) ABSTRACT

Disclosed is a method which aims to minimize the effects of inter-numerology interference between users that a base station in 5G and beyond cellular communications systems serves with multiple numerology structures by determining the users at the numerology edges optimally.

1 Claim, 1 Drawing Sheet

(56) References Cited

U.S. PATENT DOCUMENTS

| | | | |
|---|---|---|---|
| 2019/0207697 A1* | 7/2019 | Ghasemzadeh | H04W 72/082 |
| 2019/0306860 A1* | 10/2019 | Ciochina | H04W 72/0453 |
| 2019/0379488 A1* | 12/2019 | Demir | H04L 27/2605 |
| 2020/0083997 A1* | 3/2020 | Takata | H04L 5/005 |
| 2020/0092065 A1* | 3/2020 | Kuang | H04W 72/0453 |
| 2021/0152411 A1* | 5/2021 | Kuang | H04L 27/2613 |

* cited by examiner

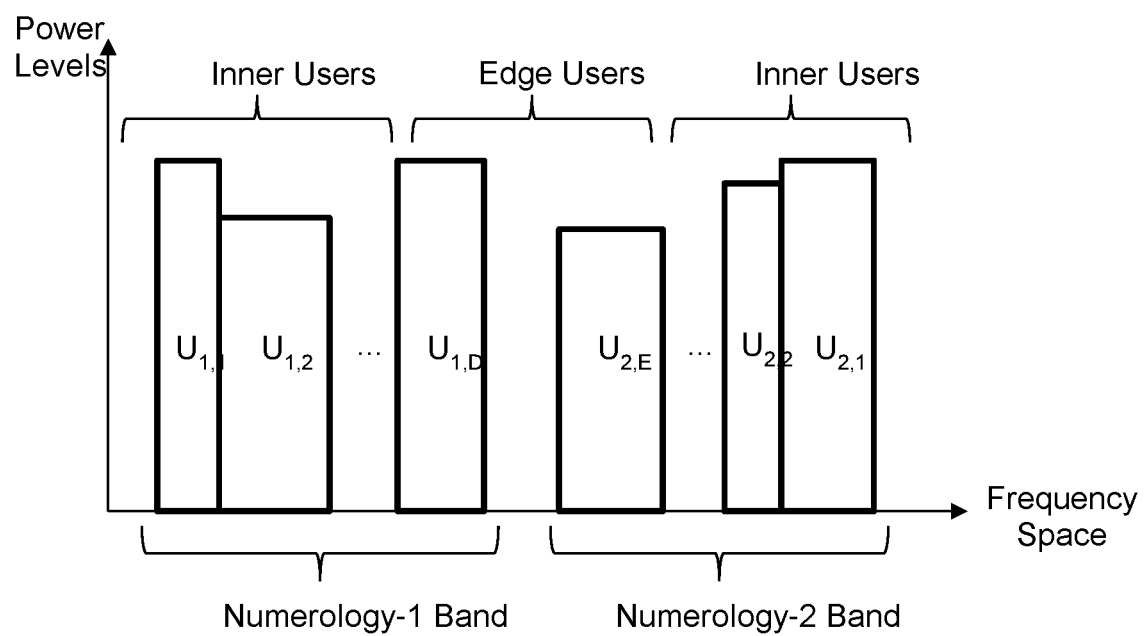

METHOD FOR DETERMINING USERS AT THE NUMEROLOGY EDGES IN FIFTH GENERATION CELLULAR COMMUNICATIONS SYSTEMS

TECHNICAL FIELD

The invention consists of a method which aims to minimize the effects of inter-numerology interference between users that a base station in 5G and beyond cellular communications systems serves with multiple numerology structures by determining the users at the numerology edges optimally.

THE STATE OF THE ART/KNOWN STATUS OF YOUR TECHNIQUE

Based on the 5th Generation (5G) standard documents published by European Telecommunications Standards Institute (ETSI) The 3rd Generation Partnership Project (3GPP), it is seen that the main difference between 5G systems and the previous cellular communications systems is the increment in application diversity and the related system flexibility coming with 5G. The mixed numerology structures, which for the first time came together with the 5G, also take one of the most important tasks at the point of system flexibility. The mixed numerology structures mean that the parameters of the waveform in the communication systems can be varied for different users. Up to 5G systems, only one parameter set can be used at a time for all users. Thanks to mixed numerology structures, it is possible to use different numerology structures for different types of users.

Although the flexibility of the system is increased due to the mixed numerology structures, as a negative result, there are interferences between different numerologies in the frequency domain. This interference results from the negative effects of different numerologies on each other, rather than on other types of interferences. In literature, although different studies have been carried out in relation to this interference, it is clear that many studies are still in progress about this subject.

The method developed within the scope of this invention provides the most appropriate way of selection of users to be placed at the numerology edges in the frequency domain as a solution to inter-numerology interference problem. In this way, 5G and beyond cellular communications systems will be improved.

Technical Problems for Solution of the Problem

The invention consists of a method which aims to minimize the effects of inter-numerology interference between users that a base station in 5G and beyond cellular communications systems serves with multiple numerology. The first part of this method aims to minimize the intense interference effects of different numerologies in the frequency space on the edges of the closest users. The second part of the method also aims to reduce the interference effects of inner users on the inner sides of numerologies, except for the consecutive edge users in the frequency domain of numerologies.

The structural and characteristic features and all the advantages of the invention will be understood more clearly by the following FIGURES and the detailed description, therefore the evaluation should be made in view of these FIGURES and the detailed description.

DESCRIPTION OF PICTURES

FIG. 1: Schematic representation describing the scenarios that are related with the method of invention

DESCRIPTION/DISCLOSURE OF THE INVENTION

In the scenario shown in FIG. 1, any two different numerologies in the frequency domain and the power levels of the users assigned to these numerologies with the positions in the frequency domain are shown. In this scenario, users assigned to the same numerology are placed sequentially without overlapping in the frequency domain. There may or may not be a protection band in the frequency domain between different numerologies. This does not change the process steps of the method according to the invention. $U_{1,2}, U_{1,2}, \ldots, U_{1,D}$ are users that use parameters of Numerology-1. $U_{2,1}, U_{2,2}, \ldots, U_{2,E}$ present users that use parameters of Numerology-2. There are D users for Numerology-1 and E users for Numerology-2. $U_{1,D}$ ve $U_{2,E}$ are called edge users and they are located at the closest edges of two numerologies in frequency domain. $U_{1,1}$ ve $U_{2,1}$ are farthest users to each other in the frequency domain. All other users than $U_{1,D}$ ve $U_{2,E}$ are called inner users. It is assumed that the power levels of each user can be different. In this context, the power levels of $U_{1,2}, U_{1,2}, \ldots, U_{1,D}$ are taken as $P_{1,2}, P_{1,2}, \ldots, P_{1,D}$ and the power levels of $U_{2,1}, U_{2,2}, U_{2,E}$ are taken as $P_{2,1}, P_{2,2}, \ldots, P_{2,E}$.

If one user for each two numerologies is considered as a pair with each other, there will be a total number of D×E user pairs. In the first part of the method according to the invention, power levels between the user pairs are sorted starting from the minimum. Placing the user pair at the numerology edges where the power level difference is the least, ensures that the peak interference effects at the edge users are minimized. For this purpose, power level differences between user pairs (s, t) are calculated using the following equation. In this equation, with the user s associated with Numerology-1; the user associated with the Numerology-2 is indicated by t.

$$PO(s,t)=|P_{1,s}-P_{2,t}|$$

The pair of users with the lowest power level difference can be found with the following equation.

$$(s,t)^* = \underset{(s,t)}{\mathrm{argmin}} PO(s,t)$$

In the second part of the method according to the invention, it is attempted to reduce the interference effects on the inner users on the inner sides of the numerologies except the edge users. Accordingly, a threshold value, $TH_p$, is obtained using the following equation. The $TH_p$ threshold value is the maximum acceptable power level difference for the user pairs. The H vector is created in which the pairs of users whose power level differences are less than this threshold value.

$$TH_p = r \times PO(s,t)^*$$

Factor of r≥1 can be changed for different scenarios in the upper equation. If r increase, the number of user pairs in H vector also increases. If the selection is like r=1, H vector contains only one user pair and this pair corresponds to the minimum power level case.

In the next step, the means of power levels ($P_{1,s}$ ve $P_{2,t}$) belong to each user pair in H vector are taken and PL vector is created with the same length with H vector. After that, the least mean power level in PL vector elements and the corresponding user pair is obtained with the following equation.

$$(s, t)^* = \operatorname*{argmin}_{(s,t)} PL$$

As a result of placing user pairs that is found using above equation at the numerology edges in frequency domain, the inner users are less affected by the inter-numerology interference, in addition to the edge users. However, if the edge user bandwidth for one numerology is large in frequency domain, the interference effects of the edge user of other numerology will be greatly reduced. In this case, the inner users on the side with the high bandwidth edge user will not be impressed by the interference caused by other numerology. In such a case, while the importance of the second part of the invention will be reduced, the first part will be of importance.

Thanks to this invention, signal-to-interference ratios of both edge users and inner users of different numerologies are improved. In terms of fairness between users, which is an important performance metric for 5G and beyond wireless communication systems, it is seen that unfairness regarding the signal-to-interference ratio between the users is eliminated with the method of the invention. In addition, the flexibility in this scope is preserved, since only the edge focuses on the decision of the users and is not involved in the positioning of other users in the frequency domain. Thus, there is no additional computational load to the base station.

The process steps of the workflow for the invention are as follows:

For users of different numerologies to be matched to each other, the power level differences between the two users for all the matching possibilities are sorted starting from minimum difference, Based on the lowest power level difference, a threshold value close to this power level is calculated, By using the calculated threshold value, a group of user pairs is created from power level differences which are smaller than this threshold, For each user pair in this group, the power levels are averaged, The user pair with the lowest average of power levels is positioned as the edge users of numerologies in the frequency domain, The placement of other users in the frequency space is left flexible.

It is evident that one competent person can also introduce the novelty set forth in the invention using similar embodiments, and/or apply this embodiment to other similar purposes as used in the art. Thus, it is evident that such embodiments will be devoid of the criterion of innovation and in particular of exceeding the known state of the art.

INDUSTRIAL APPLICABILITY/APPLICATION OF INVENTION TO INDUSTRIALIZATION

When designing and producing 5G base stations, the method of the invention may need to be implemented in these base stations. It will be appreciated by the present invention that the fairness is provided for the signal-to-interference ratio between the different users (sim card insertable devices) which can benefit from the cellular communication infrastructure. In this context, the method according to the invention will be useful in terms of base stations, mobile phones and other user units which contain sim cards to use the 5G infrastructure.

The invention claimed is:

1. A method for minimizing effects of internumerology interference between users at a base station of at least fifth generation (5G) with multiple numerologies, the method comprising:
   sorting power level differences between the users starting from a minimum power level difference so as to match users of different numerologies;
   calculating a threshold value based on a lowest power level difference;
   creating groups of user pairs by using the calculated threshold value from the power level differences that are less than the calculated threshold value;
   averaging power levels for each user pair in a group from the created groups of user pairs;
   positioning edge users of numerologies in a frequency domain for the user pair with a lowest average of power levels; and
   placing users other than the positioned edge users in a remaining frequency space.

* * * * *